United States Patent
Bonetto et al.

(10) Patent No.: US 7,604,260 B2
(45) Date of Patent: Oct. 20, 2009

(54) CLAMP-CONNECTION HOSE FOR A FLUID FEED CIRCUIT IN A MOTORVEHICLE

(75) Inventors: Ezio Bonetto, Buriasco (IT); Claudio Astegiano, Villafranca (IT)

(73) Assignee: Dayco Fluid Technologies S.p.A., Turin (IT)

( * ) Notice: Subject to any disclaimer, the term of this patent is extended or adjusted under 35 U.S.C. 154(b) by 0 days.

(21) Appl. No.: 11/996,389

(22) PCT Filed: Jul. 22, 2005

(86) PCT No.: PCT/IT2005/000432

§ 371 (c)(1),
(2), (4) Date: Aug. 29, 2008

(87) PCT Pub. No.: WO2007/010571

PCT Pub. Date: Jan. 25, 2007

(65) Prior Publication Data

US 2008/0309082 A1   Dec. 18, 2008

(51) Int. Cl.
*F16L 33/00* (2006.01)
(52) U.S. Cl. .................. 285/242; 285/256; 285/259
(58) Field of Classification Search ............. 285/222.1, 285/242, 256, 259
See application file for complete search history.

(56) References Cited

U.S. PATENT DOCUMENTS

| | | | | |
|---|---|---|---|---|
| 602,617 A | * | 4/1898 | Dale | ............ 285/241 |
| 1,235,876 A | * | 8/1917 | Cave | ............ 285/247 |
| 2,733,941 A | | 2/1956 | Trevaskis | |
| 4,212,487 A | * | 7/1980 | Jones et al. | ............ 285/95 |
| 4,963,133 A | | 10/1990 | Whipple et al. | |
| 5,261,706 A | * | 11/1993 | Bartholomew | ............ 285/242 |
| 5,388,870 A | * | 2/1995 | Bartholomew | ............ 285/242 |
| 5,829,795 A | * | 11/1998 | Riesselmann | ............ 285/256 |
| 5,868,435 A | * | 2/1999 | Bartholomew | ............ 285/23 |
| 5,884,945 A | * | 3/1999 | Bader et al. | ............ 285/222.5 |
| 6,598,906 B2 | * | 7/2003 | Brugmann | ............ 285/256 |
| 7,066,497 B2 | * | 6/2006 | Fullbeck et al. | ............ 285/256 |

FOREIGN PATENT DOCUMENTS

| | | |
|---|---|---|
| EP | 1055860 | 11/2000 |
| JP | 05126286 A * | 5/1993 |

OTHER PUBLICATIONS

International Search Report prepared by the European Patent Office on Mar. 17, 2006 for PCT/IT2005/000432; Applicant, Dayco Fluid Technologies, S.p.A.
International Preliminary Report on Patentability prepared by the European Patent Office on Oct. 15, 2007 for PCT/IT2005/000432; Applicant, Dayco Fluid Technologies, S.p.A.

* cited by examiner

*Primary Examiner*—James M Hewitt
(74) *Attorney, Agent, or Firm*—Sheridan Ross P.C.

(57) ABSTRACT

Clamp-connection hose (1) for a fluid feed circuit inside the engine compartment of a motor vehicle, comprising a side wall (2) suited to convey the fluid and an end portion (4) of the side wall (2) having an axis (A). The hose (1) comprises at least one layer of thermoplastic material and a rubber bush (3) having a tubular portion (9) housed inside the end portion (4) and suited to be connected by means of a clamp (6) to a fixing portion (20) having a cylindrical portion (30) and a conical end ridge (23)

8 Claims, 1 Drawing Sheet

CLAMP-CONNECTION HOSE FOR A FLUID FEED CIRCUIT IN A MOTORVEHICLE

This application is a national stage application under 35 U.S.C. 371 of PCT Application No. PCT/IT2005/000432 having an international filing date of Jul. 22, 2005, which designated the United States, the entire disclosure of which is hereby incorporated herein by reference.

TECHNICAL FIELD

The present invention concerns a clamp-connection hose for a fluid feed circuit connected to an internal combustion engine of a motor vehicle, for example for a fuel circuit or a cooling fluid circuit inside an engine compartment of the motor vehicle.

BACKGROUND ART

In a fuel circuit inside the engine compartment, it is a known practice to realise a clamp-connection hose comprising a single-layer conduit of thermoplastic material and a rubber conduit having a free end portion that may be connected by means of a clamp to a tubular element inserted by radial interference in the free portion itself and carried for example by a wall of the fuel pump inside the engine compartment.

The rubber conduit is flexible so that it can adapt during assembly to the narrow bulk limits imposed inside the engine compartment and it also presents a second end portion axially opposite the first free portion and suited to be connected to the pipe in thermoplastic material by means of an insert and a second clamp.

In particular, the coupling with radial interference generally used for the connection to a rubber conduit comprises a cylindrical tubular wall coming out of a wall of the pump and a conical ridge or ogive, located on a free edge of the tubular wall and defined by a conical surface diverging towards the wall of the pump.

However, the rubber conduit is expensive, which increases the total price of the pipe, and it may also be difficult to obtain on some markets, which may attain delays in supplies.

EP-A-1055860 discloses a clamp-connection hose comprising a rubber bushing inserted in an end portion of a thermoplastic tube. However, such clamp connection hose is not optimized to guarantee an appropriate extraction load required in some specific applications, e.g. in a fuel circuit of a motor vehicle.

DISCLOSURE OF INVENTION

The aim of the present invention is to devise a clamp-connection hose for a circuit of a motor vehicle, particularly for use inside the engine compartment, which is interchangeable with those of the prior art and free from the drawbacks mentioned above.

BRIEF DESCRIPTION OF THE DRAWINGS

For a better understanding of the present invention a preferred embodiment is now described, purely as a non-limiting example, with reference to the enclosed drawing in which.

BEST MODE FOR CARRYING OUT THE INVENTION

Figure 1:
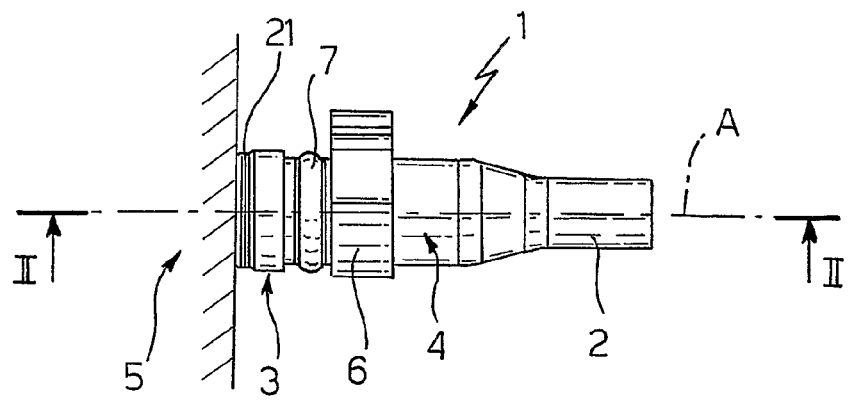
FIG. 1 is a side view of a clamp-connection hose according to the present invention.
Figure 2:
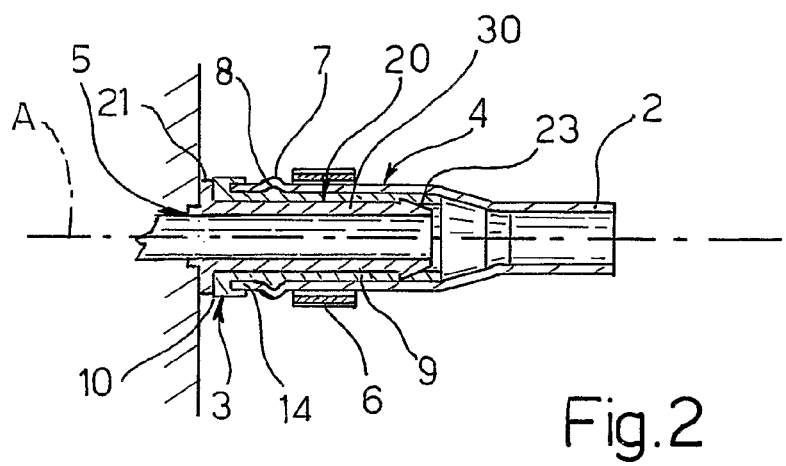
FIG. 2 is a section of FIG. 1 along the line II-II in FIG. 1.
Figure 3:
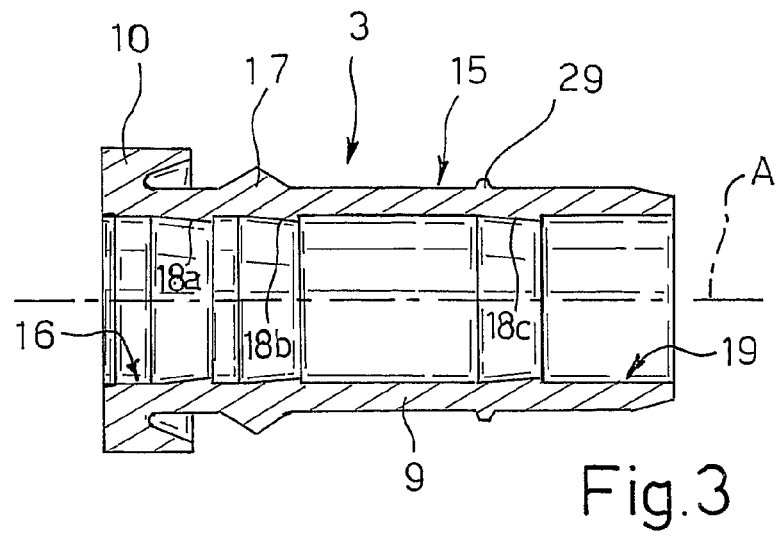
FIG. 3 is and enlarged section of a detail in FIG. 2.

In FIG. 1, numeral 1 indicates a clamp-connection hose for a fluid feed circuit inside an engine compartment of a motor vehicle, for example for a fuel circuit, comprising a flexible cylindrical side wall 2, a rubber bush 3 housed radially inside an end portion 4 integral with the cylindrical wall 2 and a snap-fastening clamp 6 for blocking on a coupling insert 5 which, in the example illustrated, comes out of a wall of a fuel pump inside an engine compartment of a vehicle.

In particular, the cylindrical wall 2 presents a longitudinal axis A and is made of a thermoplastic material, for example a material with a polyamide base, which is suitably pre-shaped to follow a broken line so as to adapt better to the size of the components that surround the engine.

The end portion 4 is coaxial with the axis A and has a diameter larger than that of the cylindrical wall 2. The end portion 4 also defines a ring-shaped bead 7 coming out towards the outside of the pipe 1 and defining a corresponding ring-shaped cavity 8 facing towards the axis A.

The rubber bush 3 is coaxial with the axis A and comprises a tubular portion 9 cooperating with the end portion 4 and a lip edge 10, and it is made of HNBR or NBR to resist petrol.

The lip edge 10 is located at one axial end of the tubular portion 9 and it is folded towards the outside thus defining an axial abutment for an edge 14 of the end portion 4.

Moreover, the tubular portion 9 is radially defined by a contact surface 15 cooperating with the end portion 4 and by a contact surface 16 cooperating with the coupling insert 5.

The contact surface 15 defines a ring-shaped rib 17 housed in the ring-shaped cavity 8 and also defining the abutment position of the edge 14 against the lip edge 10. The contact surface 15 also defines at least one ring-shaped ridge 29 cooperating against the end portion 4.

The contact surface 16 defines a plurality of radial ridges 18a, 18b, 18c facing towards the axis A and defined by respective conical surfaces converging in the direction from the lip edge 10 to the tubular portion 9.

The ridges 18a, 18b are adjacent and axially located between the lip edge 10 and the ring-shaped rib 17; at the opposite end of the ridges 18a, 18b, the contact surface 16 defines a cylindrical seat 19 and the ridge 18c is adjacent to the cylindrical seat 19 towards the ridges 18a, 18b.

The coupling insert 5 has an internal diameter equal to that of the cylindrical wall 2 to avoid localised pressure drops and it integrally comprises a fixing portion 20 cooperating by radial interference against the radial ridges 18a, 18b, 18c inside the tubular portion 9 and a collar 21 striking axially against the lip edge.

In particular, the fixing portion 20 presents a profile defined by a cylindrical portion 30 and a conical or ogival ridge 23, or diverging towards the collar 21 and cooperating by radial interference with the tubular portion 9 inside the cylindrical seat 19.

During assembly, the hose 1 is inserted on the fixing portion 20 and the insertion of the rubber bush 3 is assisted by the orientation of the conic formation of the ridges 18a, 18b, 18c. Moreover the rubber bush 3 is soft and allows water-tightness and adaptation to the profile of the fixing portion 20.

In operating position, the clamp 6 is located adjacent to the ring-shaped bead 7 on the opposite side of the edge 14. In particular, the ring-shaped bead 7 defines a further axial restraint of the rubber bush 3 on the end portion 4 and a reference for positioning the clamp 6 at a correct axial distance from the edge 14.

Moreover, the conical ridge 23 is housed in the cylindrical seat 19 and the cylindrical portion 30 of the tubular portion 9 compresses the ring-shaped ridge 29, axially located between the ring-shaped rib 17 and the cylindrical seat 19, against a cylindrical surface of the end portion 4 thus realising a fluid-tight seal.

During extraction, the clamp 6 is opened and the conical ridge 23 cooperates with the ridges 18a, 18b, 18c defining an extraction load higher than the insertion load.

The advantages that may be obtained with the present hose 1 are the following.

The hose 1 is realised in a single thermoplastic conduit eliminating the rubber portion and the relevant intermediate connection and decreasing the production costs.

Moreover, the presence of the rubber bush 3 allows a hose of thermoplastic material to be connected to an ogival connecting element by means of a clamp, maintaining adequate fluid tightness. In this way the hose 1 is interchangeable with hoses of the prior art without the need to change the ogival connecting element.

Moreover, thanks to the thermoplastic material, the hose 1 may be easily shaped to follow complicated paths and the flexibility of the cylindrical wall 2 combined with the clamp connection allows high adaptability to the overall dimensions and easy of assembly inside the engine compartment.

The ring-shaped bead 7 allows a rapid positioning of the clamp 6 at an axial distance from the edge 14 contemplated by the regulations, further simplifying assembly.

The assembly is also simplified by the fact that the lip edge 10 defines an axial abutment and prevents the rubber bush 3 from sliding towards the cylindrical wall 2 when pulled along during the insertion on the fixing portion 20.

Lastly it is clear that modifications and variations may be made to the hose 1 described and illustrated herein without leaving the protective scope of the present invention, as defined in the enclosed claims.

In the example illustrated, the fixing portion 20 having the conical ridge 23 is carried by a wall of the fuel pump inside the engine compartment. However it is also possible to use the hose 1 with an insert comprising on opposite sides a first shaped portion, for example in the shape of an upside-down pine, for connection with another hose and a fixing portion having a conical ridge similar to the one previously described and therefore suitable for clamp-connection to the hose 1.

It is also possible, in low pressure applications, for the end portion 4 to be cylindrical and not present the ring-shaped bead 7. Alternatively it is possible to provide a pair of ring-shaped beads 7 suitably distanced in an axial direction to define a seat for assembly of the clamp 6.

Moreover, the thermoplastic material of the hose may also have a polyester base and the cylindrical wall 2 and the end portion 4 may be made either from a single-layer hose or from a multilayer hose having at least one layer of thermoplastic material.

Depending on the applications, the material of the rubber bush 3 must be chosen in order to avoid leaks of the conveyed fluid, for example if the fluid transported has a water base EPDM may be used and if high temperature uses are necessary a fluorinated elastomer may be used.

The invention claimed is:

1. A clamp-connection hose assembly for a fluid feed circuit inside the engine compartment of a motor vehicle, comprising a side wall suited to convey said fluid and comprising at least one layer of thermoplastic material, an end portion of the side wall having an axis, said hose assembly further comprising a rubber bush having a tubular portion housed inside said end portion, said hose assembly suited to be connected by means of a clamp to a fixing portion having a cylindrical portion and a conical end ridge, wherein said rubber bush comprises a radial edge projecting from an end portion of said tubular portion and defining an axial abutment against an edge of said end portion, wherein said tubular portion defines at least one radial ridge facing towards said axis and defined by a conical surface converging in a direction directed from said radial edge to said tubular portion.

2. The hose assembly according to claim 1, wherein the sidewall is flexible.

3. The hose assembly according to claim 2, wherein said end portion defines a ring-shaped bead and said rubber bush comprises at least one ring-shaped rib housed in a seat defined by said ring-shaped bead.

4. The hose assembly according to claim 1, wherein said tubular portion defines at least one ring-shaped ridge cooperating by radial interference against said end portion.

5. The hose assembly according to claim 1, wherein said tubular portion defines a cylindrical cavity to house said conical ridge.

6. The hose assembly according to claim 1, wherein an internal diameter of said tubular portion is larger than that of said sidewall to avoid localised pressure drops when said hose is inserted on said fixing portion.

7. The hose assembly according to claim 1, wherein said sidewall is made of a single layer of thermoplastic material.

8. The hose assembly according to claim 1, wherein said rubber bush is EPDM, fluorinated rubber or nitryl rubber.

* * * * *